United States Patent
Osenkov et al.

(10) Patent No.: US 8,707,263 B2
(45) Date of Patent: Apr. 22, 2014

(54) USING A DSL FOR CALLING APIS TO TEST SOFTWARE

(75) Inventors: Kyrylo Osenkov, Bellevue, WA (US); Gabriel Esparza-Romero, Seattle, WA (US); Damon C. Tivel, Bellevue, WA (US); Vijaya K. Upadya, Sammamish, WA (US); Eric I. Maino, Seattle, WA (US); Ryan J. Cavanaugh, Bellevue, WA (US); Christopher Alan Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 625 days.

(21) Appl. No.: 12/762,371

(22) Filed: Apr. 19, 2010

(65) Prior Publication Data

US 2011/0258600 A1 Oct. 20, 2011

(51) Int. Cl.
*G06F 9/44* (2006.01)
(52) U.S. Cl.
USPC ............ 717/124; 717/126; 717/127; 717/131
(58) Field of Classification Search
None
See application file for complete search history.

(56) References Cited

U.S. PATENT DOCUMENTS

| | | | |
|---|---|---|---|
| 7,392,509 B2 * | 6/2008 | Sinha et al. | 717/126 |
| 7,480,898 B2 * | 1/2009 | Batten et al. | 717/124 |
| 2005/0086022 A1 * | 4/2005 | Lindberg et al. | 702/123 |
| 2005/0187930 A1 * | 8/2005 | Subramanian et al. | 707/4 |
| 2005/0240794 A1 * | 10/2005 | Sinha et al. | 714/1 |
| 2005/0267976 A1 | 12/2005 | Chang et al. | |
| 2006/0010426 A1 * | 1/2006 | Lewis et al. | 717/124 |
| 2006/0101397 A1 | 5/2006 | Mercer et al. | |
| 2007/0220342 A1 | 9/2007 | Vieira et al. | |
| 2008/0016499 A1 * | 1/2008 | Jones et al. | 717/124 |
| 2008/0127101 A1 * | 5/2008 | Anafi et al. | 717/125 |
| 2008/0270992 A1 * | 10/2008 | Georgieva et al. | 717/127 |
| 2008/0270998 A1 * | 10/2008 | Zambrana | 717/131 |
| 2009/0300585 A1 * | 12/2009 | Meenakshisundaram et al. | 717/124 |

OTHER PUBLICATIONS

Monica S. Lam, Tracking Down Software Bugs Using Automatic Anomaly Detection, 2002 ACM, pp. 291-301, <http://dl.acm.org/citation.cfm?id=581377>.*

Nathan P. Kropp, Automated Robustness Testing of Off-the-Shelf Software Components, 1998 IEEE, 10 pages, <http://ieeexplore.ieee.org/stamp/stamp.jsp?tp=&arnumber=689474>.*

Kim G. Larsen, Testing Real-Time Embedded Software using UPPAAL-TRON, 2005 ACM, pp. 299-306, <http://dl.acm.org/citation.cfm?id=1086283>.*

(Continued)

*Primary Examiner* — Thuy Dao
*Assistant Examiner* — Cuong V Luu
(74) *Attorney, Agent, or Firm* — Kevin Sullivan; Kate Drakos; Micky Minhas (57) ABSTRACT

A test case is abstracted into a re-useable script or other declarative form that expresses the intent of a task rather that defining how the test will be performed. Tools translate the declarative test into a series of steps corresponding to code that implements the action indicated in the declarative test. The schema for the tests can be dynamic. New forms of test cases can take advantage of new actions so that the library of actions can be extended. Libraries are interchangeable. Test cases can be generated using a state machine. New test cases can be composed dynamically using a state machine to create new test cases.

13 Claims, 6 Drawing Sheets

(56) References Cited

OTHER PUBLICATIONS

Justin E. Forrester, An Empirical Study of the Robustness of Windows NT Applications Using Random Testing, 2005 usenix.org, pp. 59-68, <https://www.usenix.org/legacy/events/usenix-win2000/full_papers/forrester/forrester_html/>.*

Henry Muccini, Using Software Architecture for Code Testing, 2004 IEEE, pp. 160-171, <http://ieeexplore.ieee.org/stamp/stamp.jsp?tp=&arnumber=1271170>.*

Patrice Godefroid, Automating Software Testing Using Program Analysis, 2008 IEEE, pp. 30-37, <http://ieeexplore.ieee.org/stamp/stamp.jsp?tp=&arnumber=4602671>.*

Dimitriadis, Dimitris., "DOM Test Suite Methodology Report", Retrieved at << http://www.itl.nist.gov/div897/ctg/conformance/DOMTSmethod.pdf >>, NIST GCR 04-860, Feb. 2004, pp. 1-22.

"Using Domain Specific Languages", Retrieved at << http://martinfowler.com/dslwip/UsingDsls.html >>, Apr. 9, 2008, pp. 12.

Li, Bei., "Layered Architecture for Test Automation", Retrieved at << http://www.infoq.com/articles/layered-test-automatation >>, Aug. 11, 2009, pp. 7.

Tolvanen, Juha-Pekka., "Domain-Specific Modeling: Making Code Generation Complete", Retrieved at << http://www.devx.com/architect/Article/31351/1954 >>, Retrieved Date: Feb. 16, 2010, pp. 11.

* cited by examiner

```
                 202
<TestScenario>
<LaunchCalcProgram />  204
                             206
<ClickCalcButton ButtonName="2" />  208
<ClickCalcButton ButtonName="+" />  210
<ClickCalcButton ButtonName="2" />  212
<ClickCalcButton ButtonName="=" />
                             213
<VerifyCalcResult="4" />
</TestScenario>
```

```
        214          216
Class ClickCalcButton : Action
{
        string ButtonName;
        Override this.Execute(Action) =
}
```

FIG. 2b

```
<TaoTest>
  <InitTest>
    <StartTarget />
    <CreateProject />
  </InitTest>

<ScenarioList>
    <Scenario Name="Rename a generic class at definition">

<AddFileByContext FileName="RenameGenerics.cs" />  —— 222
    <OpenFileByContext FileName="RenameGenerics.cs" />  —— 224
    <Rename StartLocation="class1" OldName="A" NewName= "ARenamed"
    <FindWhat="ARenamed" —— 228
    <Build />                                                          226
    <Run />

</Scenario>
  </ScenarioList>
```

```
Public class FindAction : Action
{
    [Required]— 242
    public string What { get; set; }— 236
    public bool Expected { get; set;}
    public bool SearchInHiddenText {get; set;}
    public bool MatchWholeWord {get; set;} protected override void Execute(Engine engine)
    {
        if (DTE.Editor.Find(What, true, SearchInHiddenText, MatchWholeWord)
                    && !Expected)
            throw new UnexpectedResultException("...");
        else if (Expected)
            throw new UnexpectedResultException("...");
    }
}
```

USING A DSL FOR CALLING APIS TO TEST SOFTWARE

BACKGROUND

Test cases are typically comprised of program code. Over time a large test bed of many different programs is typically developed. When the software the test programs test changes, the test programs need to be refactored and updated. The high cost of maintaining the test programs hinders not only the development of new test cases but also the evolution of the libraries that the test cases use. Writing test cases in program code also makes it more difficult to outsource test work to other companies or vendors because the process of writing code needs to be reviewed and because it requires considerable skill.

SUMMARY

The test case is abstracted into a declarative form such as a re-useable script or file, etc. that expresses the intent of a task rather that defining how the test will be performed. Tools translate the declarative statements into a series of steps corresponding to code that implements the action indicated in the test. The schema for the tests can be dynamic. New forms of test cases can take advantage of existing and new actions so that the library of actions can be extended. Libraries are interchangeable. Test cases can be generated using a state machine. New test cases can be composed dynamically using a state machine to create new test cases.

Because the test is developed in a non-traditional programming language, the test developer is subjected to a discipline that puts constraints on his or her test making options, preventing him or her from creating invalid tests and providing a built-in feature that forces the test author to consider how the test will be performed as he or she writes the test case. At any given point only a finite set of available actions are available, preventing the test writer from inadvertently causing problems by creating incorrect tests.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Typically, tests are written in code and are tightly coupled to implementation. Tests written in code are fragile and difficult to maintain. Implementation changes often render the tests inoperative. Porting tests to a different automation framework tends to be labor-intensive and costly. It is often difficult to know what scenarios an automated test case covers because it is hard to perform queries on test code written in a traditional programming language. Tests written in program code are hard to read and hard to write. Tooling support for writing tests is limited. For these reasons and others, testing is difficult to outsource.

The subject matter disclosed herein describes methods, systems and computer program products for a data-driven (instead of a code-driven) test framework in which tests are abstracted into actions that are specified in a declarative or domain specific language or script instead of coded in a traditional programming language. The test cases are independent of the underlying test automation framework and implementations of the software being tested. Tests express what to test and what is expected rather than how to test. A test engine can execute the test by interpreting the actions specified in the test. Interchangeable libraries can be developed for different implementations and/or different automation frameworks. The abstraction layer described herein can be layered on top of any automation framework including but not limited to MAUI, DTE Microsoft's Visual Studio® automation library and other automation frameworks.

Tests written as described herein are easy to write, run, debug, query, understand and maintain. Test authors are forced to factor tests in a clean, maintainable way that avoids duplication and promotes reuse. The layered architecture enables sharing of common layers across teams of developers. Changes in software implementations are easily managed by having interchangeable libraries. Tests written as described herein can be used to test at the user interface level, at the component level, at the application programming interface (API) level and so on.

Using a Declarative Language to Call APIs to Perform Software Testing

Figure 1A:
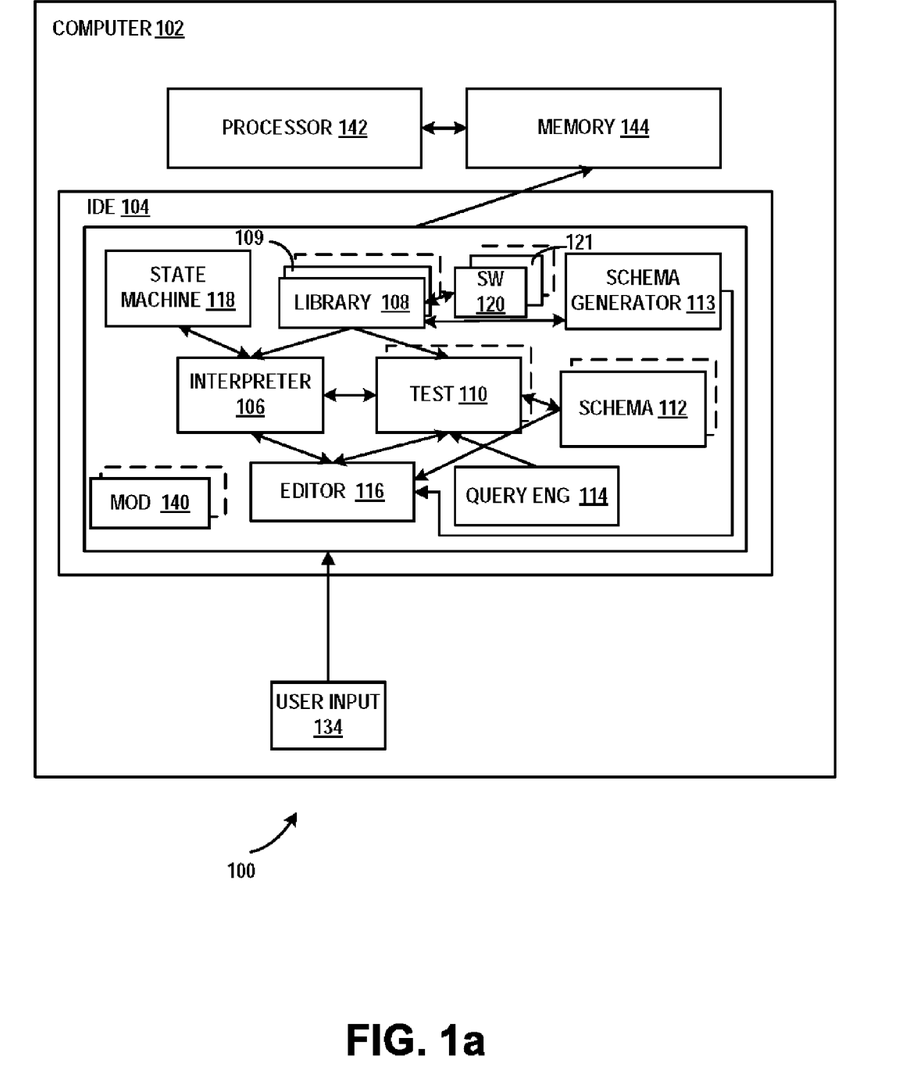
FIG. 1a illustrates an example of a system 100 for using a declarative language to call APIs to perform software testing in accordance with aspects of the subject matter disclosed herein.

FIG. 1a illustrates an example of a system 100 for using a domain specific language to call APIs to perform software testing in accordance with aspects of the subject matter disclosed herein. All or portions of system 100 may reside on one or more computers such as the computers described below with respect to FIG. 3. All or portions of system 100 may reside on one or more software development computers such as the computers described below with respect to FIG. 4. The system 100 or portions thereof may comprise a portion of an integrated development environment such as the ones described below and illustrated in FIG. 4. Alternatively, system 100 or portions thereof may be provided as a stand-alone system or as a plug-in or add-in.

System 100 may include one or more computers such as computer 102. The one or more computers may include one or more of: a processor (such as processor 142), a memory such as memory 144, and one or more modules, such as module 140, etc., for using a declarative language to call APIs to perform software testing. Other components well known in the arts may also be included but are not here shown. It will be appreciated that the module(s) for using a declarative language to call APIs to perform software testing can be loaded into memory 144 to cause one or more processors such as processor 142 to perform the actions attributed to the module(s) for using a declarative language to call APIs to perform software testing.

The system 100 for using a declarative language to call APIs to perform software testing may include one or more of the following: a test engine such as a script executer or scripting engine or an interpreter 106, etc., one or more libraries of test actions such as library 108, library 109, etc., tests such as test 110, etc. a schema 112, a test query engine 114 and a test editor 116. The system 100 may also include software being tested, as illustrated in FIG. 1 by software 120, software 121, etc. Software 120 can be, for example one implementation of software being tested and software 121 can be another implementation of software being tested. The test engine (e.g., interpreter 106) can execute the test 110 step by step by extracting an action from the test 110, finding its implementation in a library 108 of test actions and executing the action. For example, interpreter 106 can execute test 110 by interpreting test 110 and executing a corresponding implementation for each step of the test at runtime. Implementation can be provided or changed without changing existing tests by loading a different library into interpreter 106. A running instance of the software being tested (acting as a state machine 118) may also be included in system 100. System 100 may comprise a portion of an interactive editing environment or read-evaluate-print-loop (REPL) or an integrated development environment or IDE such as IDE 104.

A test or test case such as test 110 can be an abstraction of a testing intent. The testing intent can be specified in a declarative form by declarative statements that are independent of implementations of the software and/or independent of a testing framework or testing automation framework. Tests such as test 110, etc. can be written in a customized declarative language, a scripting language, or a domain specific language. Test 110 is not written in a traditional, general purpose programming language like C++ or C#. In test 110, the intent of the test is expressed but how the test is conducted is not defined. That is, the test expresses what to test but not how to test it. Test intent is separated from implementation, so that implementation does not affect the test. This means that if implementation aspects of software change, the tests that test the software do not have to be changed. Implementation changes can be handled by changing the library of action implementations, for example, by loading a different library into the interpreter during testing.

For example, a first library of actions may test a first implementation of software using a test and a second library of actions may test a second implementation of software (such as a second version of the software, for example) using the same (unchanged) test. Similarly, a first library of actions may test a first automation framework for software testing using a test and a second library of actions may test a second automation framework for software testing using the same (unchanged) test. Because tests are not dependent on implementation, tests are reusable and are resilient to underlying test framework changes. Automation infrastructure can be modified or replaced without affecting the utility of the tests. Tests as described herein can be used to test software at the user interface level, at the component level, at the API level and for both test and production software environments. Tests can be created according to a methodology. For example an explicit API design can require actions to have recognizable signatures. A test case can comprise a sequence of actions. An action can be implemented as a call to an API using a method caller as described more fully below.

A test (e.g., test 110) can be associated with a schema such as schema 112. A schema enables a test to be checked for correctness resulting in verifiable tests. For example, tests written in XML can be verified with an XML schema. Association with a schema can provide automatic correctness proving and can provide static type checking programming aids such as auto-completion, member lists and so on when editing and developing tests in a test editor such as test editor 116. User input 134 (e.g., creating a test case) can be received by the editor 116 and can by checked for correctness as the user is developing the test case using the schema 112. A schema 112 can be generated by a schema generation tool 113 that reflects over the libraries and generates a schema that includes all the valid actions and valid signatures for each valid action. That is, the schema can establish a finite set of valid actions and a finite set of valid signatures for each action in the finite set of valid actions during development of the test case. A schema defines a valid test file and can be used to provide interactive programmer aids like auto-completion and correctness checking when writing or editing test cases.

Because tests are written in a language that is machine-readable, rich tool support can be provided for test authoring. Examples of tools include editors, such as editor 116 in FIG. 1, and others including but not limited to generators, test searchers, navigators and so on. An editor such as editor 116 may be provided for developing tests. Editor 116 may receive one or more schemas such as schema 112 to provide static type checking program aids such as auto-completion to the test author as he or she is writing or editing a test 110. Editor 116 may also be able to provide verification of correctness of the test based on the schema or based on information derived from the schema.

Libraries such as library 108, etc. include one or more action implementations. A library can be an extensible pool of atomic actions. Libraries, as described above, can be interchangeable. That is, an action implementation can be substituted by another action implementation so that the same test can execute on different implementation frameworks or on different implementations of software by loading a different library or set of libraries. More than one library can be loaded into the interpreter or script engine concurrently. If more than one library includes a specified action, an algorithm for selecting which action to execute can be provided (e.g., use action from the last library loaded, from the first library loaded, select an action at random, cycle through libraries, and so on). Each action within the library can be parameterized with data. The data description can form the signature of an action. Each action can provide the data prescribed by the signature of an action. An action implementation can be written in a general purpose programming language such as C#, C++ and so on. Duplication of code is more easily avoided by centralization of code in a library.

Figure 2A:
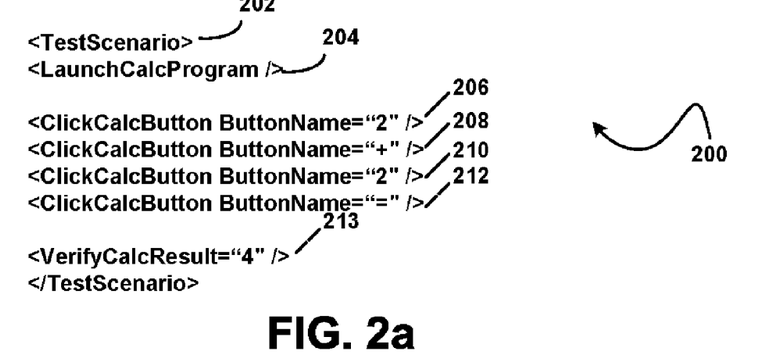
FIG. 2a is an example of a test case in accordance with aspects of the subject matter disclosed herein.

A state machine (e.g., a running instance of the software to be tested) such as state machine 118 may provide changes in state so that continuous testing can occur. A query engine such as query engine 114 can search all the tests for occurrences of a specified action, (e.g., find all tests that exercise (push) the calculator equals button). Because tests are written in a declarative form, untested portions of software under development can be more easily discovered. During test execution, one or more libraries can be loaded, an action in the library can be identified and dynamically loaded and the action can be executed. A script executing engine or interpreter such as interpreter 106 can receive a test, load it, load one or more libraries, identify the actions to be executed and execute the actions of the test in a sequential order. Interpreter 106 may dynamically load known actions from an action library such as library 108. An example of a test 220 is illustrated in FIG. 2a. Test 220 is written in XML but it will be appreciated that test 220 can be written in any declarative, domain specific or scripting language.

Figure 1B:
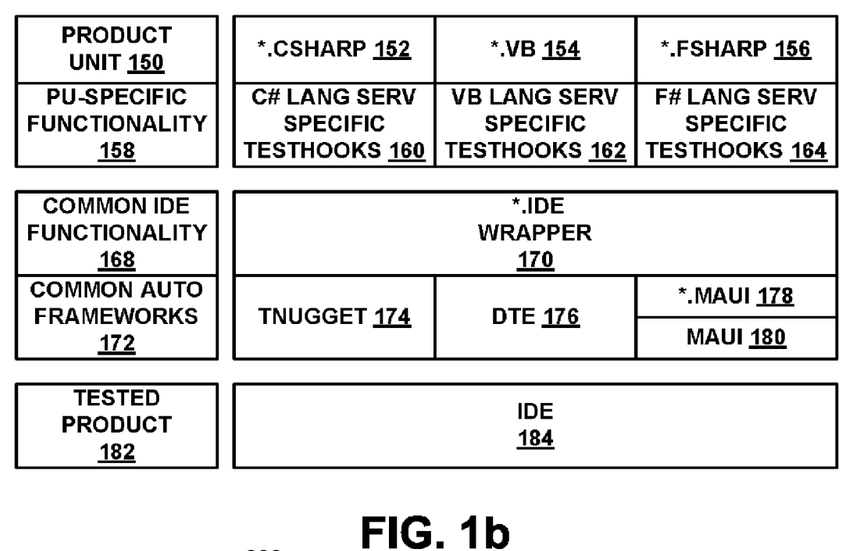
FIG. 1b illustrates an example of how the layered architecture of system 100 can be shared among developer teams in accordance with aspects of the subject matter disclosed herein.

The layered architecture described above facilitates sharing common layers across teams of developers. FIG. 1b illustrates an example of how layers can be shared. Product unit teams 150 can include developer teams such as a C# team 152, a VB team 154 and an F# team 156. Examples of product unit specific functionality 158 is represented by separate testhooks for the C# language service specific testhooks 160, the VB language service specific testhooks 162 and the F# language service specific testhooks 164. Common IDE functionality 168 can be shared by all the product teams (*.IDE-Wrapper 170). Common automation frameworks 172 may include frameworks such as TNugget 174 used by the C# team, while the DTE automation library 176 may be used by the VB team and the MAUI framework 180 with its adapter *.Maui 178 may be used by the F# team where all the teams are testing a product 182 such as an IDE 184.

FIG. 2a illustrates a fragment of a test case 200 beginning with a test node called TestScenario 202. The test case TestScenario 202 is written in the declarative, domain specific, non-traditional programming language XML, although it will be appreciated that test case 200 could be written in any declarative, domain specific language, non-traditional programming language such as but not limited to Json, LISP, Python, custom text file format, or as a Microsoft Excel® spreadsheet. The node titled LaunchCalcProgram in the statement <LaunchCalcProgram/> 204 is an example of an action that expresses the intent of launching a program (such as calc.exe, for example) in a declarative way that is independent of any particular implementation. Elsewhere, in one or more libraries, code typically exists that actually launches the calculator program and interacts with the host operating system. The statement "<LaunchCalcProgram/> 204 is followed by several statements that indicate the intent of clicking on a calculator's two key: <ClickCalcButton ButtonName="2"/> 206, plus key <ClickCalcButton ButtonName="+"> 208, two key, <ClickCalcButton ButtonName="2"/> 210 or equals key, <ClickCalcButton ButtonName="="/> 212. ButtonName is a parameter (e.g., of type integer) that is being passed and refers to an attribute (name) of the button to click. Thus, instead of using custom code in the test case, the intent is indicated in a declarative way. The statement <VerifyCalcResult="4"/> Line 213 expresses an expected result. It will be appreciated that even a test author with no programming language skills in a traditional general purpose programming language with no knowledge of automation libraries would be able to author such a test case. The action name and the parameters comprise the signature of the action. The schema associated with the declarative language can be used to provide auto-completion and other types of programming aids for the developer as he or she is writing the test case in a test editor.

As described above, a test engine such as an interpreter can load the test case (e.g., test case 200), can identify the actions to be executed and can identify any applicable parameters. For example, interpreter 106 of FIG. 1 can load test case 200, identify the action ClickCalcButton with parameter ButtonName="2" of statement ClickCalcButton ButtonName="2"/> 206. The interpreter can then dynamically load known actions from a library of actions such as library 108 of FIG. 1 which can contain the actual code to automate the test scenario. This can be done through a code reflection based mechanism to decouple the test case language from the automation code.

Figure 2B:
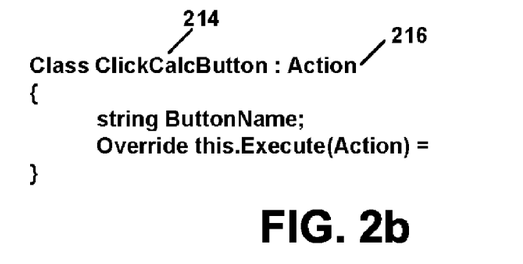
FIG. 2b is an example of an implementation of an action in accordance with aspects of the subject matter disclosed herein.

FIG. 2b illustrates a portion of an example implementation of the action ClickCalcButton. For example, code in a traditional programming language such as C# may define a class name ClickCalcButton 214 of type Action 216 that can implement a particular interface or inherit from a particular base action so that when ClickCalcButton 214 is executed the custom code that performs the instructions to do the clicking of the calc button action in that particular implementation. At runtime the test engine can access all the properties of the elements in the test case. For example in the test scenario example described above, the code corresponding to the ClickCalcButton action would be executed four separate times. The first time the ClickCalcButton was invoked the property for ButtonName would have the value "2", the second time it would have the value "+" and so on. A preprocessing step may load the test case file and find the corresponding code elements that correspond to the elements in the test case file. At runtime the code elements can be constructed in such a way that information from the test case file is passed to the code elements so that for example, the ClickCalcButton action has a property called ButtonName that refers to the key that was pressed. Every time the ClickCalcButton action is executed, the button name is set to the appropriate value.

Figure 2C:
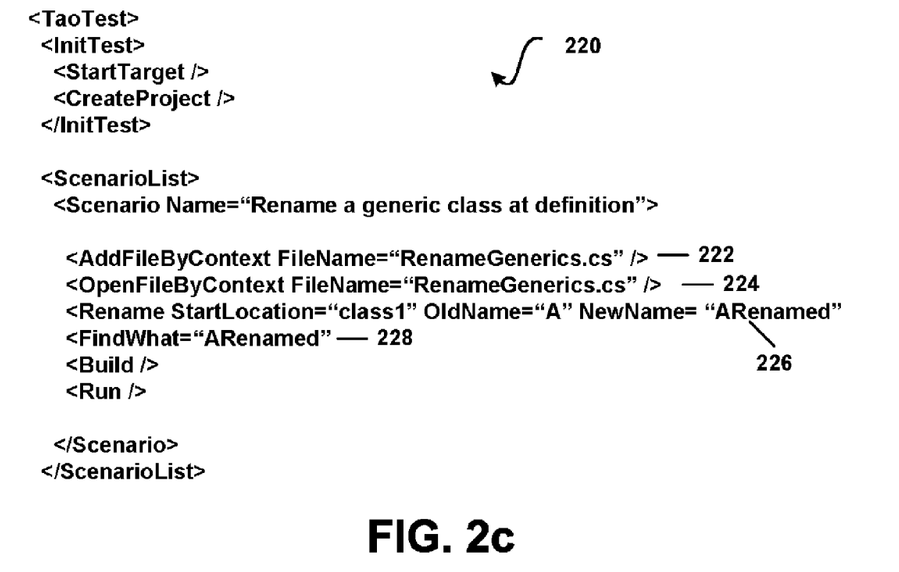
FIG. 2c is another example of a test case in accordance with aspects of the subject matter disclosed herein.

FIG. 2c illustrates another example of a test 220 that renames classes. The statement <AddFileByContext FileName="RenameGenerics.cs" 222 adds the file RenameGenerics.cs to the IDE. The statement <OpenFileByContext Filename="RenameGenerics.cs" 224 opens the file (e.g., triggered by doubleclicking the name, or by selecting an option from a menu). The statement <Rename StartLocation="class1" OldName="A" NewName="ARenamed"/> 226 invokes the functionality to rename class A to class ARenamed. The statement <Find What="ARenamed"/> 228 verifies that the rename operation was successful by finding the class ARenamed. In the statement <AddFileByContext FileName="RenameGenerics.cs" 222, FileName is a parameter having the value "RenameGenerics.cs". In the statement <OpenFileByContext Filename="RenameGenerics.cs" 224 FileName is a parameter having the value "RenameGenerics.cs". In the statement <Rename StartLocation="class1" OldName="A" NewName="ARenamed"/> 226, StartLocation with the value "class1", OldName with the value "A" and NewName with the value "ARenamed are parameters of the action Rename.

Figure 2D:
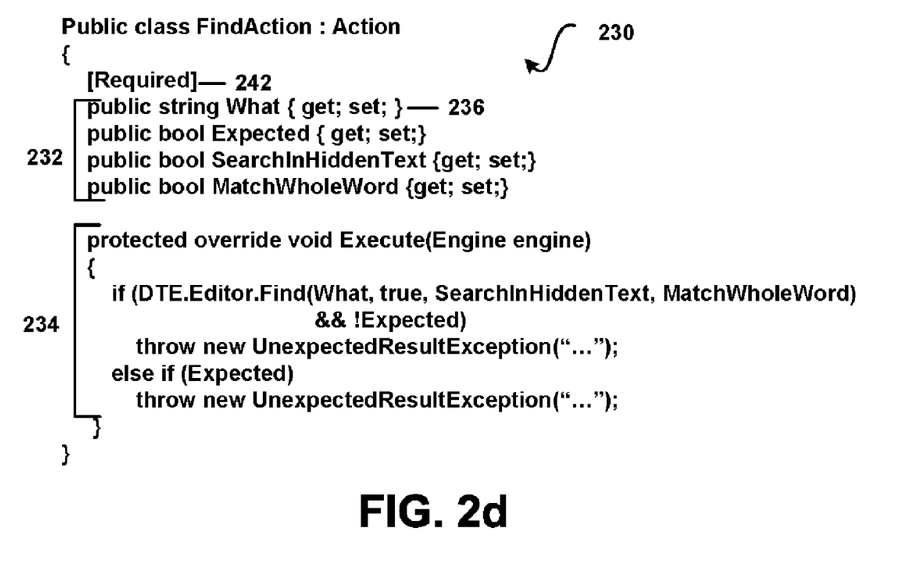
FIG. 2d is another example of an implementation of an action in accordance with aspects of the subject matter disclosed herein.

FIG. 2d illustrates a sample action implementation 230 written in C#. In the sample action implementation 230, action signature 232 is a declaration of the data that is needed by the action. In action implementation 230, one string (for What is to be found) and three Booleans will be read from the test case. The implementation of the action 234 defines what is done with the data that is extracted from the test case. For each action call in the test case, the test engine initializes the action instance and automatically fills properties from the test case. For example for the statement <Find What="ARenamed"/> 228 the content of the string What in line 236 of FIG. 2d is set by reading line <Find What="ARenamed"/> 228 from FIG. 2c and setting What to "ARenamed". Properties can be of primitive types such as Boolean (bool), string or integer (int), complex types such as .NET types or lists of any types. Mapping can be performed by an object deserializer. If a property (e.g., What in line 236) is marked with the Required property 242 and is not found in the test case, an exception can be thrown.

Figure 2E:
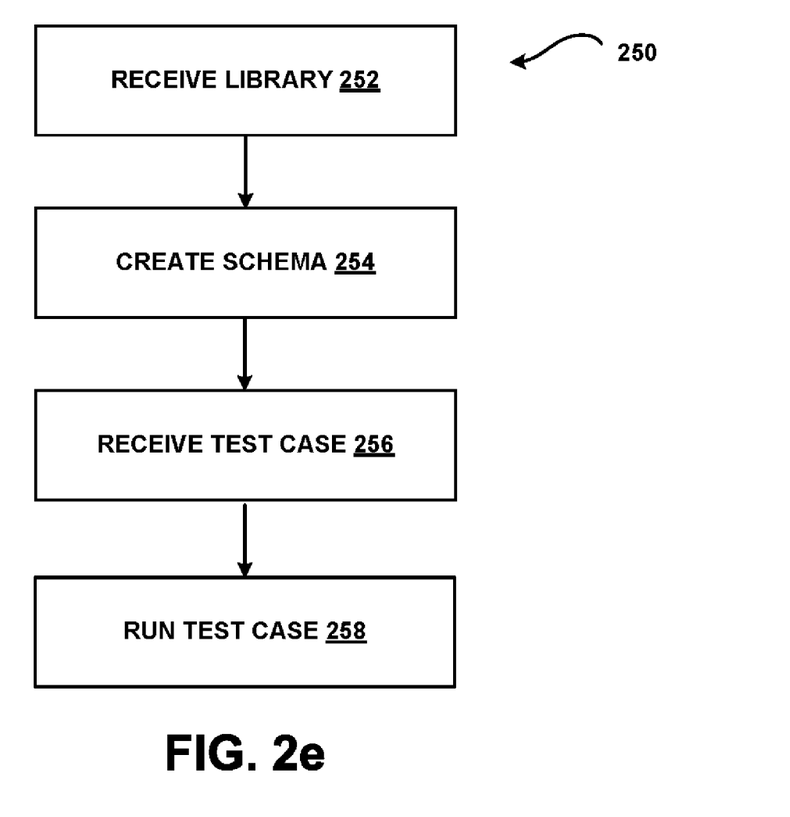
FIG. 2e is a flow diagram of an example of a method 250 for using a declarative language to call APIs to perform software testing in accordance with aspects of the subject matter disclosed herein as described with respect to FIG. 1.

FIG. 2e illustrates an example of a method 250 for using a domain specific language for calling APIs to test software in accordance with aspects of the subject matter disclosed herein. One or more of the acts described in method 250 are optional. At 252 an implementation for actions is written or received. At 254 a schema is created from the library of actions. At 256 a test case as described herein is written or received and can be validated using the schema. At 258 a test using the test case is run. A test engine can receive the test case, extract the first action, find the action in one or more libraries by matching the name of the action in the test case with a name of an action in the one or more libraries, instantiate the class implementing the action, create an instance of the class in memory, reading in the parameters for the instance of the class from the test case and calling the execute method on that class. Alternatively, instead of calling an execute method, a method caller can read in the action from the test case and can match the action name not only to an action class but also to any method on any class. Thus, if there are any public (callable) methods then the method caller can treat the parameters for the action as parameters for that method. Instead of calling the execute method the method caller can call whatever method was specified. This feature opens possibilities for generic scripting, API calling, testing, and creation of an XML-based DSL for calling APIs because APIs are typically methods on classes.

Example of a Suitable Computing Environment

Figure 3:
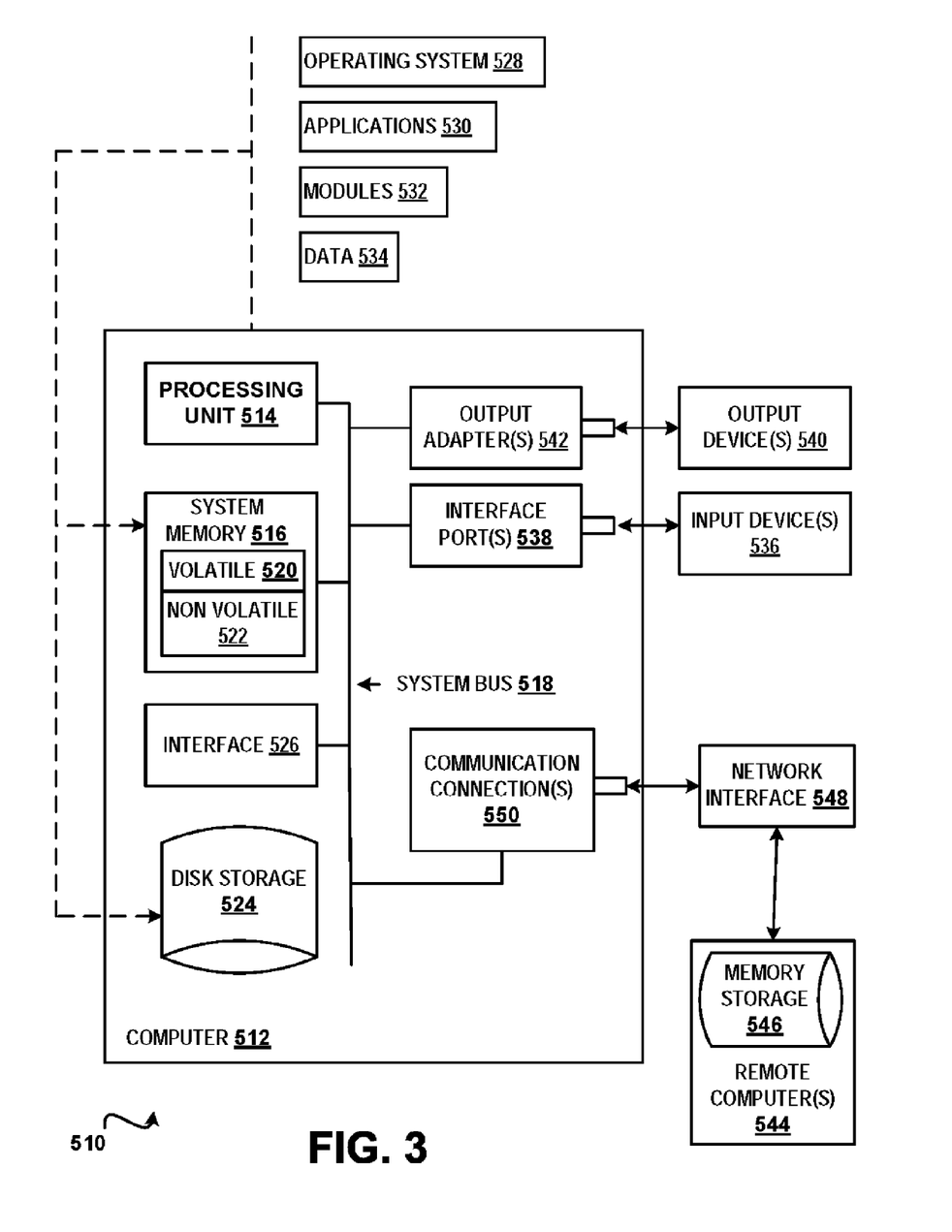
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
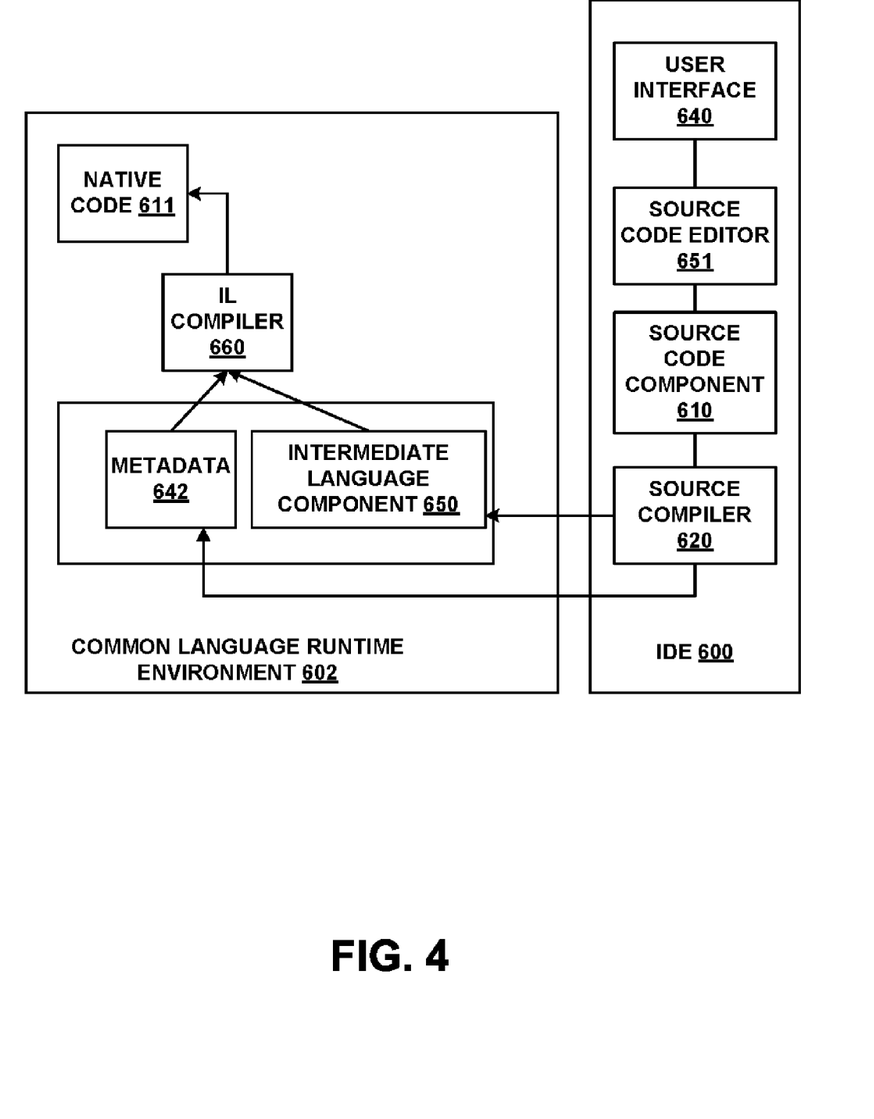
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A computer-implemented method comprising:
receiving on a software development computer a test case written in a declarative form, the test case comprising at least one action, a parameter for the at least one action and a value for the parameter, the test case comprising an abstraction of a test intent independent of software implementation;
reading the at least one action of the test case, the parameter and the value;
matching a name of the at least one action of the test case with a name of a method on a class in a first library, wherein the first library is associated with a first implementation of software,
assigning the value of the parameter of the at least one action of the test case to a value of a parameter of the method in the first library;
executing the method in the first library to test the first implementation of the software on the software development computer;
matching the name of the at least one action of the test case with a name of a method on a class in a second library, wherein the second library is associated with a second implementation of software, wherein the first implementation of software is different than the second implementation of software, wherein the second library is different than the first library,
assigning the value of the parameter of the at least one action of the test case to a value of a parameter of the method in the second library; and
executing the method in the second library to test the second implementation of the software, wherein at any given point during creation of the test case, the test case is associated with a schema, wherein the schema establishes a finite set of valid actions and a finite set of valid signatures for each valid action of the finite set of valid actions are available.

2. The method of claim 1, wherein the test case is written in a scripting language and wherein the method of claim 1 is executed by a test engine comprising a scripting engine in a read-evaluate-print-loop environment.

3. The method of claim 1, wherein the test case is written in a domain specific language and wherein the method of claim 1 is executed by an interpreter.

4. The method of claim 1, wherein the test case is written in a domain specific language.

5. The method of claim 1, wherein the test case is written in a declarative programming language.

6. The method of claim 1, wherein the test case is composed dynamically using a state machine.

7. A system comprising:
a processor and a memory including a module configured to cause the processor to:
receive on a software development computer a test case written in a declarative form, the test case comprising at least one action, a parameter for the at least one action and a value for the parameter, the test case comprising an abstraction of a test intent independent of software implementation;
read the at least one action of the test case, the parameter and the value;
match a name of the at least one action of the test case with a name of a method on a class in a first library, wherein the first library is associated with a first implementation of software,
assign the value of the parameter of the at least one action of the test case to a value of a parameter of the method in the first library;
execute the method in the first library to test the first implementation of the software on the software development computer;
match the name of the at least one action of the test case with a name of a method on a class in a second library, wherein the second library is associated with a second implementation of software, wherein the first implementation of software is different than the second implementation of software, wherein the second library is different than the first library,
assign the value of the parameter of the at least one action of the test case to a value of a parameter of the method in the second library; and
execute the method in the second library to test the second implementation of the software, wherein at any given point during creation of the test case, the test case is associated with a schema, wherein the schema establishes a finite set of valid actions and a finite set of valid signatures for each valid action of the finite set of valid actions are available.

8. The system of claim 7, wherein the valid signature comprises an action name and parameters of an associated valid action.

9. The system of claim 7, wherein the schema is used to provide interactive programmer aids comprising auto-completion and correctness checking.

10. A computer-readable storage memory comprising computer-executable instructions which when executed cause at least one processor to:
receive on a software development computer a test case written in a declarative form, the test case comprising at least one action, a parameter for the at least one action and a value for the parameter, the test case comprising an abstraction of a test intent independent of software implementation;
read the at least one action of the test case, the parameter and the value;
match a name of the at least one action of the test case with a name of a method on a class in a first library, wherein the first library is associated with a first implementation of software,
assign the value of the parameter of the at least one action of the test case to a value of a parameter of the method in the first library;
execute the method in the first library to test the first implementation of the software on the software development computer;
match the name of the at least one action of the test case with a name of a method on a class in a second library, wherein the second library is associated with a second implementation of software, wherein the first implementation of software is different than the second implementation of software, wherein the second library is different than the first library,
assign the value of the parameter of the at least one action of the test case to a value of a parameter of the method in the second library; and
execute the method in the second library to test the second implementation of the software, wherein at any given point during creation of the test case, the test case is associated with a schema, wherein the schema establishes a finite set of valid actions and a finite set of valid signatures for each valid action of the finite set of valid actions are available.

11. The computer-readable storage memory of claim 10, comprising further computer-executable instructions which when executed cause at least one processor to:
receive the test case wherein the test case is written in a customized declarative language, a scripting language, or a domain specific language.

12. The computer-readable storage memory of claim 10, comprising further computer-executable instructions which when executed cause at least one processor to:
compose test cases dynamically using a state machine to create new test cases.

13. The computer-readable storage memory of claim 10, comprising further computer-executable instructions which when executed cause at least one processor to:
query test cases.

* * * * *